United States Patent [19]

Kamada et al.

[11] Patent Number: 4,939,540
[45] Date of Patent: Jul. 3, 1990

[54] WINKER AUTOMATIC CANCELING DEVICE

[75] Inventors: Soetsu Kamada, Furukawa; Shinji Sasaki, Minamikata, both of Japan

[73] Assignee: Alps Electric Co., Ltd., Tokyo, Japan

[21] Appl. No.: 319,207

[22] Filed: Mar. 3, 1989

[30] Foreign Application Priority Data

May 12, 1988 [JP] Japan .............................. 63-61587[U]

[51] Int. Cl.⁵ ................................................ H01H 3/16
[52] U.S. Cl. .................................... 335/190; 200/61.27
[58] Field of Search ................ 200/12, 61.27; 340/475, 340/476, 477; 335/186, 189, 190

[56] References Cited

U.S. PATENT DOCUMENTS

| | | | |
|---|---|---|---|
| 2,535,384 | 12/1950 | Batt | 340/476 X |
| 2,863,096 | 12/1958 | Hollins | 340/476 X |
| 2,924,680 | 2/1960 | Swenson | 200/12 X |
| 4,577,117 | 3/1986 | Takeda et al. | 335/190 X |
| 4,748,298 | 5/1988 | Chretien | 200/12 |

FOREIGN PATENT DOCUMENTS 58-56643 4/1983 Japan .

Primary Examiner—J. R. Scott
Attorney, Agent, or Firm—Guy W. Shoup; Paul J. Winters

[57] ABSTRACT

An automatic canceling device for a winker system of an automobile that can effectively reduce the size of the solenoid incorporated and hence the overall size as well as the manufacturing cost of the device is provided. Such an automatic canceling device comprises a case, a winker operating lever pivotably fitted to the case, an expandable engaging section connected to the lever by way of a compression spring, a locking cam unit provided within the case and engaged with the engaging section to hold the lever in a neutral, left or right position, a releasing member provided in abutment with a cam provided on the lever to return the lever to its unlocked position and a solenoid to be energized by a release signal to activate the releasing member.

1 Claim, 5 Drawing Sheets

WINKER AUTOMATIC CANCELING DEVICE

BACKGROUND OF THE INVENTION

This invention relates to an automatic canceling device for a winker and more specifically it relates to an automatic electric canceling device for an automobile winker that unlocks the winker by means of suction power of a solenoid provided in the device even if the operating knob is located far from the steering shaft of the automobile.

A conventional automatic electric canceling device for an automobile winker typically comprises an operating lever which is pivotably fitted to a case and pivoted by an operating knob. A driving rod is slidably held by the lever by way of a compression spring and pressed against a juxtaposed cam unit. As shown in FIGS. 5(a) and 5(b), the cam unit comprises a fixed cam section 1 and a vertically movable cam section 3 provided in slit 2 which is located at the center of fixed cam 1. The fixed and movable cam sections 1 and 3 are respectively provided with grooves 4 and 5 to hold the winker operating lever in a neutral position. Fixed cam section 1 is provided with locking grooves 6 and 7 for firmly holding the winker operating lever respectively in left and right positions. The movable cam section 3 is biased downward by a spring and can be moved upward to unlock the lever by means of a solenoid which is energized by a release signal produced, for example, by a returning action of the steering wheel of the automobile.

A conventional automatic canceling device for a winker as described above operates in the following manner.

FIG. 5(a) illustrates a cam unit holding a winker operating lever in the left or right locking position. Under this condition, movable cam section 3 is found in a retracted position so that the surface of its groove 5 is aligned with the surface of locking groove 6 and that of locking groove 7 of fixed cam section 1 and the driving rod of the winker operating lever which is not shown in the drawing is engaged in locking groove 6 or 7 so that the winker operating lever is locked in the left or right locking position. Under this condition, the left or right winker is turned on and off to emit repeated flashes.

When the steering wheel is returned to the normal position, the switching mechanism of the winker is activated by a cam provided on the steering shaft to energize the solenoid. The energized solenoid moves movable cam section 3 upward against the pressure of the compression spring so that the surface of groove 5 of movable cam section 3 comes in alignment with the surface of groove 4 of fixed cam section 1 as shown in FIG. 5(b). Then the driving rod engaged in locking groove 6 or 7 is pressed by the surface of groove 5 of movable cam section 3 and moved toward central edge 6a of 7a of locking groove 6 or 7. At the position as shown in FIG. 5(b), the driving rod passes over central edge 6a or 7a and goes into grooves 4 and 5 which come to hold the rod in a neutral condition. Thereafter, the solenoid is deenergized and movable cam section 3 is moved downward by the compression spring to return to the position as shown in FIG. 5(a). At this stage, while movable cam 3 is moved downward and its groove 5 is disengaged from the driving rod, the winker operating lever is held in its neutral position as the rod comes into engagement with groove 4 of fixed cam section 1.

With an automatic canceling device of prior art as described above, the compression spring which is used to press the driving rod against cam groove 4 is required to have a considerable spring force in order to firmly hold the winker operating lever in the neutral position. This means that the spring force will become even greater when the driving rod comes into engagement with left or right locking groove 6 or 7. Since movable cam section 3 has to be pushed upward against the pressure of the compression spring to push the driving rod upward by the electromagnetic force of the energized solenoid, the spring force of the compression spring will be enormous when the lever is unlocked. Such a strong spring force in turn inevitably requires the use of a powerful and large solenoid in order to push movable cam section 3 upward against the pressure of the spring, consequently making it difficult to reduce the size as well as the cost of the solenoid.

In view of the above described and other problems of the prior art, it is therefore an object of the present invention to provide an automatic canceling system for a winker which requires only a relatively small force for activating cancelation of the winker so that the size as well as the manufacturing cost of the solenoid may be reduced.

SUMMARY OF THE INVENTION

According to the invention, the above described object and other objects can be achieved by providing an automatic canceling device for a winker comprising a case, a winker operating lever pivotably fitted to the case, an expandable engaging section connected to the lever by way of a compression spring, a locking cam unit provided within the case and engaged with the engaging section to hold the lever in a neutral, left or right position, a releasing member provided in abutment with a cam provided on the lever to return the lever to its unlocked position and a solenoid to be energized by a release signal to activate the releasing member.

With such an arrangement as described above, the winker operating lever can be pivoted to its unlocked position by an action of the releasing member without the solenoid directly compressing the compression spring and therefore without requiring a large force to compress the compression spring. As a result, the solenoid is required to exert only a relatively small force to activate the releasing member and consequently a solenoid of a reduced size and that can be manufactured with a reduced cost may be used so that reduction of the overall size as well as the cost of the winker system can be realized.

BRIEF DESCRIPTION OF THE DRAWINGS

Now the present invention will be described in greater detail by referring to the accompanying drawings which illustrate an embodiment of the invention. In the drawings.

DETAILED DESCRIPTION OF THE INVENTION

Figure 1A:
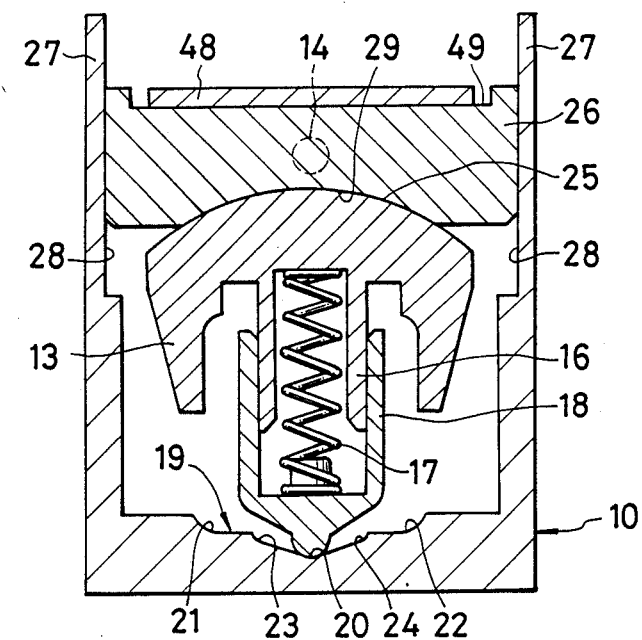
FIGS. 1(a) and 1(b) show sectional views of the principal area of an embodiment of the automatic canceling device for a winker according to the present invention, in which the device is held respectively in the neutral position and the left or right position.
Figure 2:
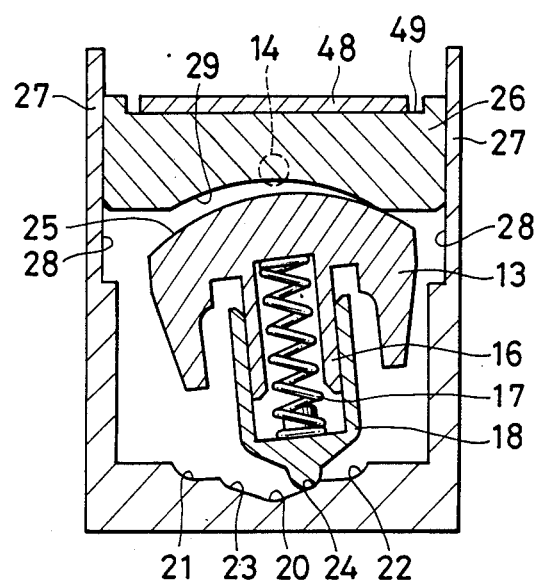
FIG. 2 is a partial sectional view of the embodiment of FIGS. 1(a) and 1(b), illustrating a condition where lane shift is taking place.
Figure 3:
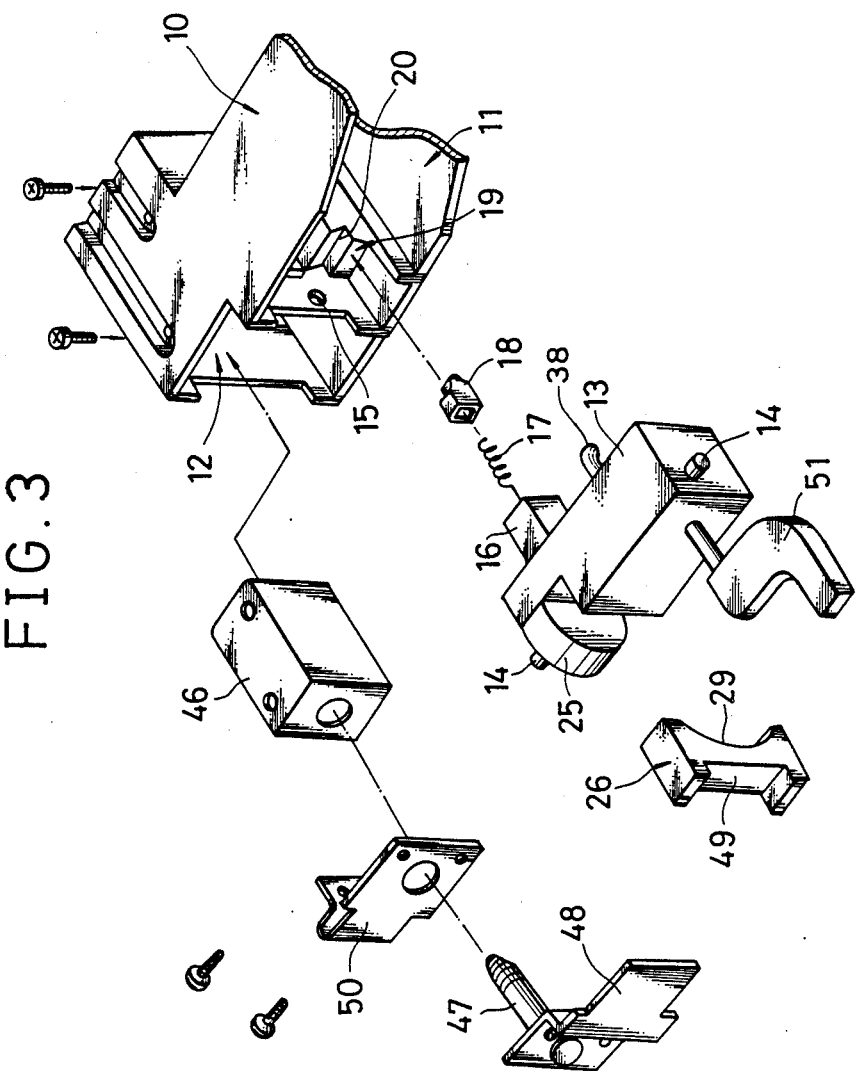
FIG. 3 is a perspective exploded view of the embodiment of the invention.

In the drawings, reference numeral 10 denotes a case. The case 10 comprises container sections 11 and 12 having and upper opening, of which container section 11 accomodates a winker operating lever 13 pivotably fitted thereto. The lever 13 is provided with a pair of pivots 14, 14 on its both end faces which are respectively engaged with supporting bores 15, 15 provided on the juxtaposed wall of container section 11. The straight line distance between said pivots 14, 14 define a fulcrum. The lever 13 is also provided with a holder 16 in the form of a square pillar projecting from the isolated lower, or first, end thereof, into which a drive shaft, or first cam follower, 18 that acts as a connecting member is inserted via a compression spring 17. The lower end of the drive shaft 18 is pressed against a first cam 19 formed on the inner bottom wall of case 10 by the spring force of compression spring 17. As shown in FIG. 1(a), the cam 19 comprises a groove 20 to hold the winker lever in a neutral position and grooves 21 and 22 on its both sides to hold it respectively in left and right positions as well as stepped portions 23 and 24 which are used for lane shift operations as shown in FIG. 2. On the other hand, lever 13 is provided with a second cam follower 25 having a profile of an arc on the top wall thereof, against which a release member 26 is pressed under the pressing effort of a plate spring of the solenoid. The release member 26 is guided by guiding grooves 28, 28 formed on the side panels 27, 27 of case 10 to move up and down. The lower central portion of the release member 26 has an abutment or second cam 29 having a profile of an arc which agrees with that of said cam follower 25, while both lower lateral portions of release member 26 are formed to a flat shape. Abutment 29 of release member 26 is shorter than the the corresponding section of cam follower 25 so that the end portion of the abutment 29 abuts cam follower 25 when winker operating lever 13 is pivoted left or right. Besides, winker operating lever 13 supports a rotational shaft 30 which is perpendicular to the direction of the pivot 14. A drive section 31 having a non-circular section is formed on rotational shaft 30 and a passing lever 32 is provided on the drive section 31. The passing lever 32 has an extension at an end which acts as a spring support member 33 and supports one end of coil spring 34. The other end of the coil spring 34 is supported by a spring support member 35 provided on winker operating member 13 so that coil spring 34 biases passing lever 34 clockwise around the rotational shaft 30 as viewed in FIG. 4. An operating projection 36 is provided in the lower isolated area of the passing lever 32, the operating projection being used to operate high-low switch 37 of the head lights of the automobile. An operating shaft 38 is also provided in the lower isolated area of the passing lever 32 and the operating shaft 38 is inserted into bores 41, 42 of lower sliding members 39, 40. The sliding member 39 slides on a substrate 43 in the direction perpendicular to the surface of FIG. 4 in such a manner that switching operation is performed by a slider 44 accommodated on the lower surface on the sliding member 39 that moves between the left and right switching contacts formed on substrate 43. Sliding body 40 is also accommodated in sliding member 39 and slider 45 accommodated on the lower surface of the sliding body 40 connects the passing contacts provided on the substrate 43. Solenoid 46 is accommodated in container section 12 of case 10 and fitted thereto by a screw. The operating shaft 47 of the solenoid 46 has an activating member 48 having an extension which abuts the recess 49 provided on the upper surface of the release member 26. Plate spring 50 is provided in such a manner that its one end is rigidly fitted to a side of case 10 and its other end is in close contact with activating member 48 so that release member 26 is pressed against cam follower 25 via activating member 48 under the pressure spring 50.

Reference numeral 51 denotes an operating knob and the operating knob 51 is located on the upper surface of passing lever 32.

The embodiment of the automatic canceling device for a winker according to the invention and having a configuration as described above functions in the following manner.

In the neutral position as shown in FIG. 1(a), winker operating lever 13 is pressed against groove 20 of cam 19 under the pressing effort of compression spring 17 and held in the groove 20. At the same time, release member 26 is pressed against cam section 26 provided on the upper surface of winker operating lever 13 under the influence of plate spring 50 so that winker operating lever 13 is firmly held in the neutral position and any excessive idle movement of the lever is prevented from occurring. Therefore, under the condition as shown in FIG. 1(a), neither the left lamp nor the right lamp of the winker system will be energized to flash.

Figure 1B:
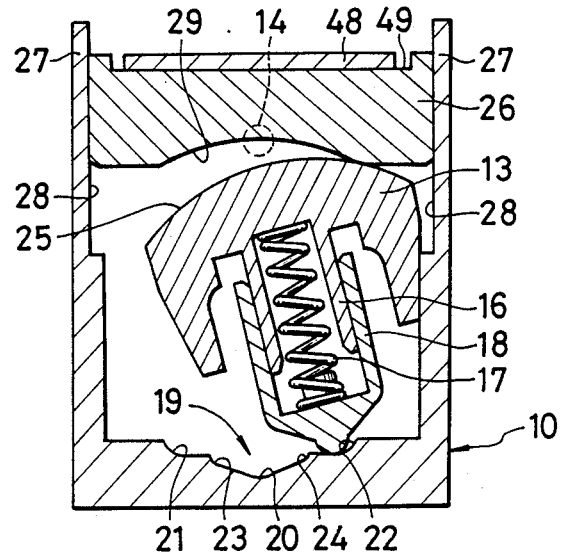
Figure 4:
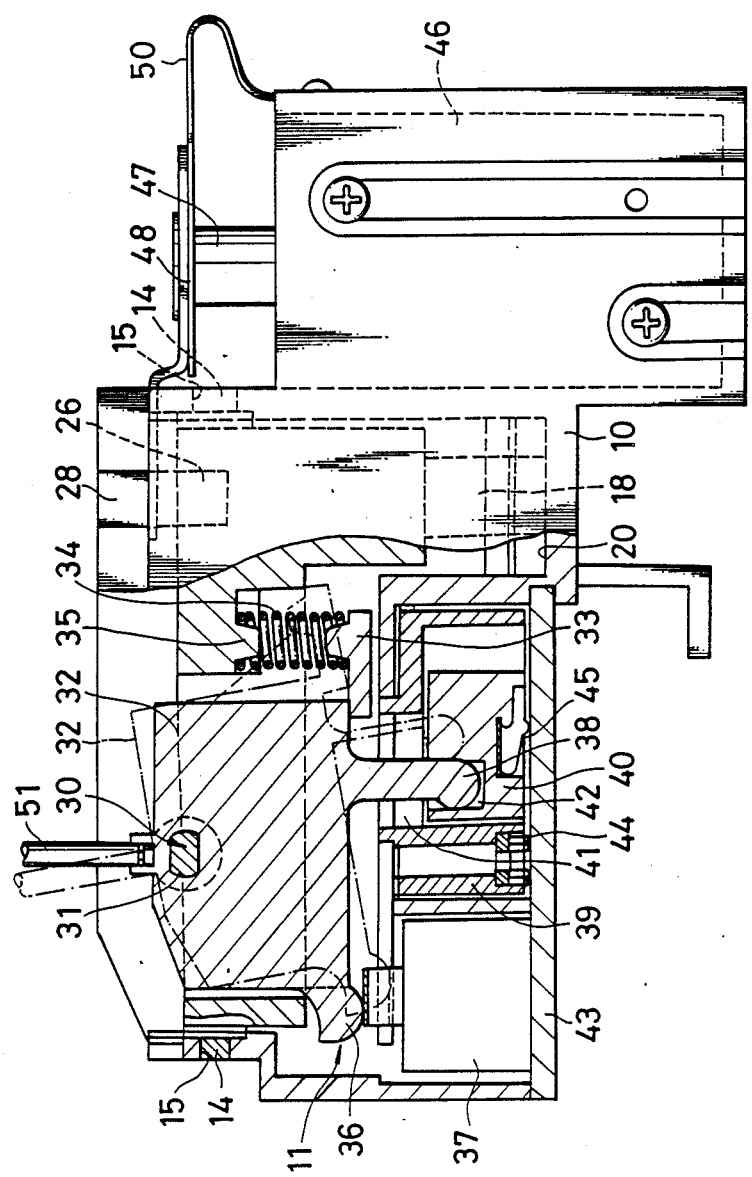
FIG. 4 is a longitudinal sectional view of the embodiment of the invention.
Figure 5A:
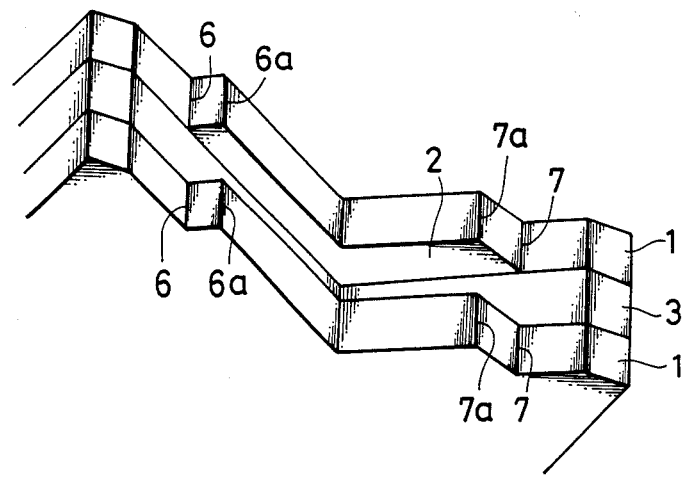
FIGS. 5(a) and 5(b) illustrate a conventional winker automatic canceling device.
Figure 5B:
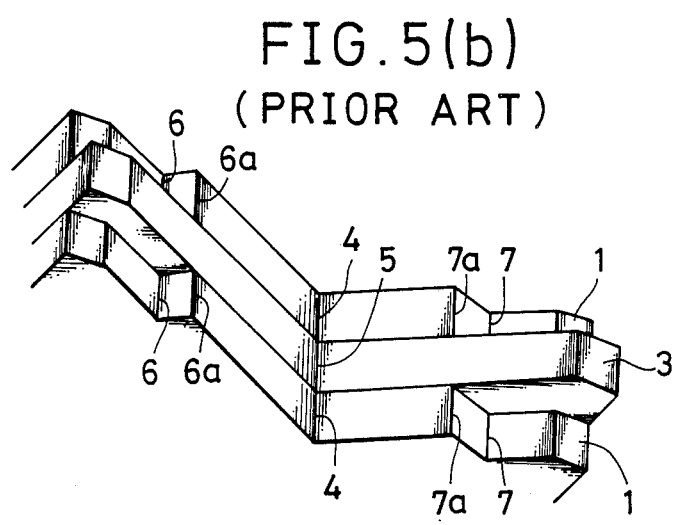

Now, if for example the left lamp of the winker system is to be activated to repeatedly flash on and off, operating knob 51 is pushed downward in the direction perpendicular to the surface of FIG. 4. The pushing movement causes a pivoting movement of winker operating lever 13 around pivots 14, 14 by way of rotation shaft 30. Then drive shaft 18 goes over stepped portion 24 into groove 22 and held thereto as shown in FIG. 1(b) under the pressing effort of compression spring 17. This pivoting movement of winker operating lever 13 accompanies a pivoting movement of operating shaft 38 as shown in FIG. 4 so that sliding body 39 is slidingly moved by the operating shaft 38 on substrate 43 and accordingly slider 44 is connected with the switching contact of substrate 44 for the left lamp of the winker system. The pivoting movement of winker operating lever 13 also tilts cam follower 25 on the upper surface to push up release member 26 which abuts the cam from above against the force of plate spring 50. As shown in the left side of FIG. 1(b), cam follower 25 abuts the end of abutment 29 of release member 26 under this condition.

The winker will be released from its operating position in the following manner. As the steering wheel is returned to its normal position to energize solenoid 46, operating shaft 47 is pulled downward as shown in FIG. 4 as well as activating member 48. Then release member 26 is slidingly moved downward by activating member 48 along guide grooves 28, 28 from the position as shown in FIG. 1(b). Then, the right end portion of cam follower 25 which is pressed against the corresponding end portion of abutment 29 of release member 26 is pushed downward to pivot winker operating lever 13 to the neutral position. This pivoting movement causes drive shaft 18 to move from groove 22 to groove 20 by way of stepped portion 24 so that it is held in groove 22 as shown in FIG. 1(a). At the same time, sliding member 39 returns to its original position to release the flashing operation of the left lamp of the winker system.

As the embodiment comprises case 10, winker operating lever 13 pivotably fitted to case 10, an expandable drive shaft 18 connected to the lever 13 by way of a compression spring 17, locking cam 19 engaged with the drive shaft 18 and provided with grooves 20, 21 and 22 for holding lever 13 respectively in the neutral, left and right positions, release member 26 provided in abutment with cam follower 25 provided on the lever 13 to return the lever to its unlocked position and solenoid 46 to be energized by the return movement of the steering wheel that activates the release member 26, the embodiment having such an arrangement does not require solenoid 46 to offer a large force to compress compression spring 17 since solenoid 46, when energized, turns release member 26 to the position where winker operating lever 13 is unlocked without requiring compression of compression spring 17 to be realized directly by solenoid 46. Moreover, since the surface of abutment 29 of release member 26 is totally abutted to cam follower 25 in the neutral position, the neutral position is securely maintained without causing any unnecessary idle movement of the lever so that the requirement of pressing effort of compression spring 17 may be significantly reduced and consequently a relatively small spring may be used. Additionally, as shown in FIG. 1(b) for the left position of the lever, since the contact point between cam follower 25 and abutment 29 of release member 26 is located considerably apart from pivot 14, the force required to operate winker operating lever 13 can be rather small. This effect along with the effect of the pressing effort of plate spring 50 allows to realize solenoid 46 of reduced dimensions. A solenoid of a reduced size will in turn reduce the overall size of the device and its manufacturing cost.

What is claimed is:

1. An automatic canceling device for a winker comprising
    a case;
    a lever pivotally disposed within said case, said lever having a pair of pivots, the straight line distance between said pivots defining a fulcrum, said lever also having a first end and an opposing second end;
    a resilient member having a first resilient end and an opposing second resilient end, said first resilient end operably connected to said first end of said lever;
    a first cam follower disposed on said second resilient end of said resilient member such that said first cam follower is biased in a substantially radial direction away from said fulcrum;
    a first cam disposed in said case adjacent said first cam follower, said first cam defining a first neutral area and at least one first non-neutral area such that when said first cam follower is adjacent said neutral area, said resilient member is at a lowest biased state, and when said lever is pivoted such that said first cam follower is adjacent said non-neutral position, said resilient member is in a greatest biased state;
    a second cam follower disposed on said second end of said lever;
    a second cam disposed within said case and adjacent said second cam follower, said second cam follower having a second neutral area and at least one second non-neutral area such that when said first cam follower is in said first neutral area of said first cam, said second cam follower is in said second neutral area of said second cam; and when said first cam follower is in said first non-neutral area of said first cam, said second cam follower is in said second non-neutral area of said second cam;
    a solenoid disposed within said case and operably connected to said second cam such that when said solenoid is activated, said second cam is pressed against said second cam follower;
wherein
    when said first and second cam followers are adjacent said neutral areas of said first and second cams, respectively, said second cam follower is disposed against said second cam such that pivoting of the lever about the fulcrum is impeded,
    and when said first and second cam followers are adjacent said non-neutral areas of said first and second cams, respectively, said lever is locked into position by means of said resilient member pressing said first cam follower against said non-neutral area of said first cam,
    and when said solenoid is activated, said second cam follower is pressed against said second cam such that said lever is forced to rotate about said fulcrum, thereby causing said first cam follower to slide along said first cam toward said neutral area without significantly deforming said resilient member.

* * * * *